March 23, 1971    A. B. WIECZOREK    3,572,099
ULTRASONIC NON-DESTRUCTIVE TESTING APPARATUS AND METHOD
Filed Aug. 23, 1968    2 Sheets-Sheet 1
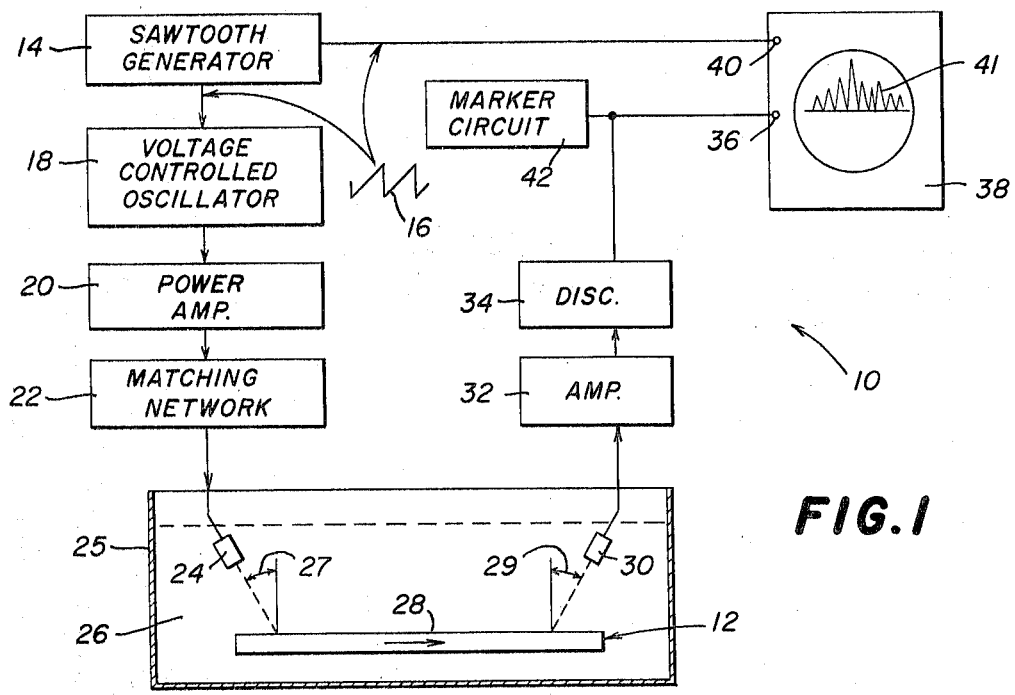
FIG.1
FIG.2
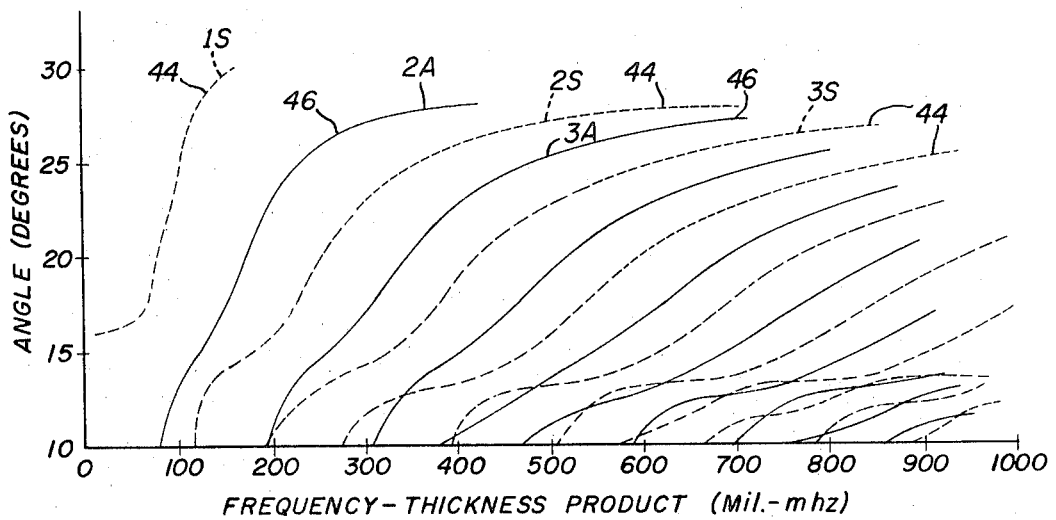
INVENTOR
ALFRED B. WIECZOREK
BY
Prangley, Baird, Clayton, Miller & Vogel
ATTYS.

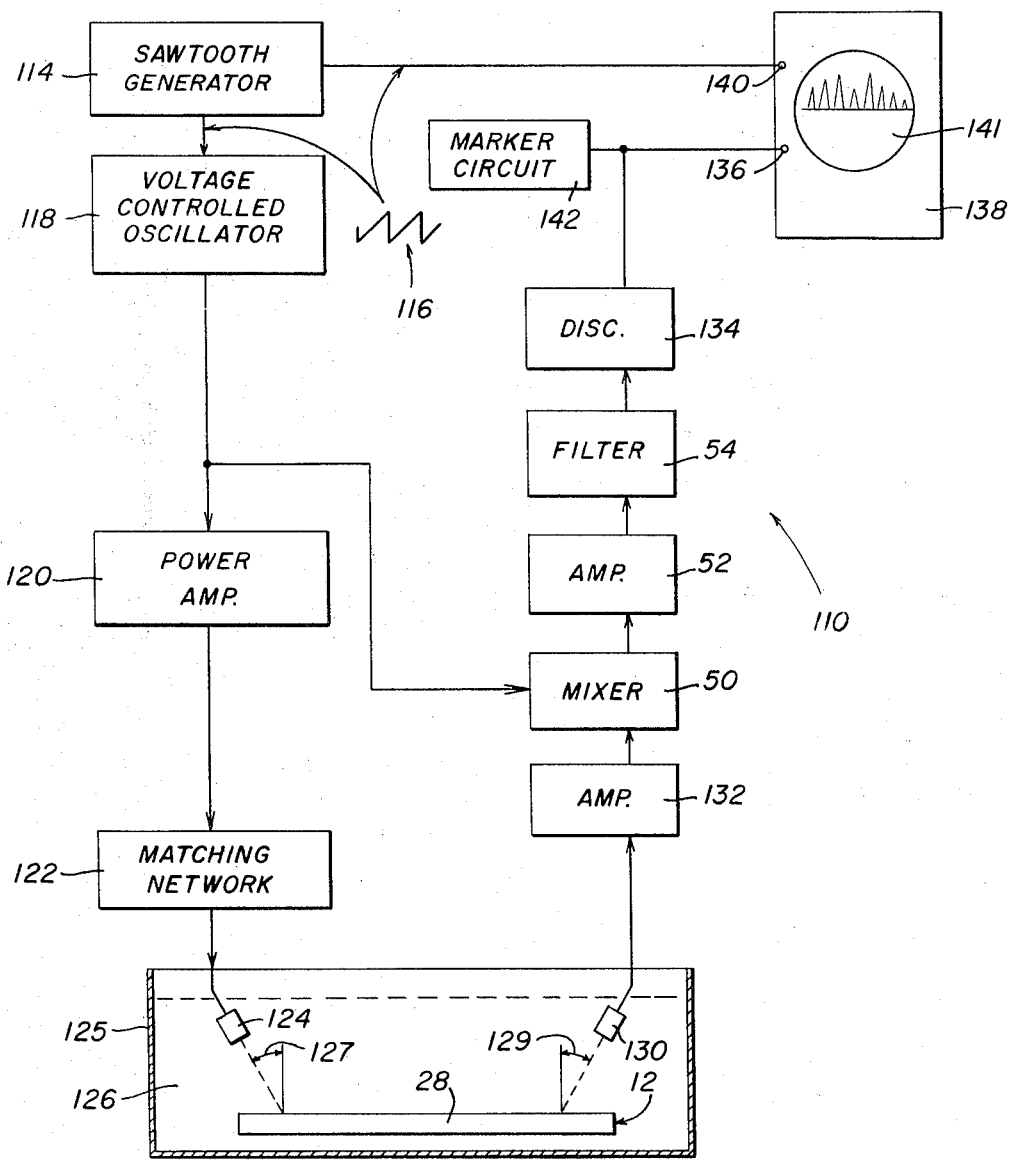

United States Patent Office 3,572,099
Patented Mar. 23, 1971

3,572,099
ULTRASONIC NON-DESTRUCTIVE TESTING
APPARATUS AND METHOD
Alfred B. Wieczorek, Mount Prospect, Ill., assignor to
General American Transportation Corporation, Chicago, Ill.
Filed Aug. 23, 1968, Ser. No. 754,861
Int. Cl. G01n 29/00
U.S. Cl. 73—67.7                                26 Claims

ABSTRACT OF THE DISCLOSURE

A continuous frequency-modulated electrical wave having a continuous frequency-modulation of a repetitive wave shape is generated and is converted into an ultrasonic transmitted wave which is continuous and frequency-modulated of the repetitive wave shape. The ultrasonic wave is impinged on an object such that a series of ultrasonic pulses each corresponding to a Lamb wave mode is induced therein. The ultrasonic pulses are converted to electrical test pulses which are then correlated with the modulating frequencies.

---

This invention relates to an ultrasonic nondestructive testing apparatus and method which utilize Lamb waves for determining the thickness of an object and the location of defects therein.

Lamb waves (named after Horace Lamb, who in 1916, postulated their existence) are induced in an object when the object is impinged upon by an ultrasonic wave, and the product of the ultrasonic frequency and the thickness of the object has a particular relationship to the angle of impingement. Lamb waves have in the past been used for inspection purposes, but the ultrasonic wave consisted of a train of pulses which necessarily had a low energy content when compared with the energy content of a continuous wave. Because of the substantial attenuation of the Lamb wave while it is being propagated in the object, any undue loss in the intensity of the impinging ultrasonic wave may cause the exiting ultrasonic wave to be of an intensity too low to be detected.

A further shortcoming in the previous methods of using Lamb waves for inspection purposes arises because the impinging ultrasonic wave had a fixed frequency so that only one Lamb wave mode could be induced, whereby comparison tests between various parts of the object were difficult to make.

It is therefore now an object of this invention to provide a method and an apparatus for nondestructive testing wherein Lamb waves are induced in an object to be inspected by utilizing a continuous ultrasonic wave.

Another object of the invention in connection with the foregoing object is to frequency-modulate the ultrasonic wave in order to induce a number of Lamb wave modes in the object thereby facilitating comparison tests.

Another object of the invention is to provide an ultrasonic nondestructive testing apparatus incorporating the features of the present invention for use in inspecting test sections to depths no greater than about 100 mils, the apparatus comprising a generator for providing a continuous frequency-modulated electrical wave having a continuous frequency-modulation of a repetitive wave shape including at least a portion of a predetermined frequency range, a transducer for converting the electrical wave into an ultrasonic transmitted wave and transmitting the ultrasonic wave to the test section and receiving an ultrasonic test wave out of the test section and converting the ultrasonic test wave into an electrical test wave, the ultrasonic wave being continuous and frequency-modulated of the repetitive wave shape, means for coupling the ultrasonic wave to a test surface of the test section so as to impinge the ultrasonic wave on the test surface within a predetermined range of angle so as to induce in the portion of the test section between the test surface and a reflecting surface spaced a distance no greater than about 100 mils from the test surface at least one mode of Lamb wave and so as to produce at least one mode of Lamb wave as the ultrasonic test wave, the ultrasonic test wave comprising a series of ultrasonic pulses each corresponding to one mode of Lamb wave produced in the test section, the coupling means coupling the ultrasonic test wave from the test surface to the transducer, the transducer converting the ultrasonic pulses in the ultrasonic test wave into an electrical test wave comprising a train of electrical test pulses each corresponding to one mode of Lamb wave produced in the test section, and means for correlating the train of electrical test pulses with the modulating frequencies along the repetitive wave shape.

Another object of the invention is to provide in an ultrasonic nondestructive testing apparatus of the type set forth a mixer for combining the electrical test wave and a portion of the electrical wave produced by the generator to provide a difference frequency electrical test wave and a sum frequency electrical test wave and a low pass filter coupled to the mixer for passing only the difference frequency electrical test wave.

A further object of the invention is to provide an ultrasonic nondestructive testing method for inspecting test sections to depths no greater than about 100 mils, the method comprising the steps of generating a continuous freqency-modulated electrical wave having a continuous frequency-modulation of a repetitive wave shape including at least a portion of a predetermined frequency range, converting the electrical wave into an ultrasonic transmitted wave that is continuous and frequency-modulated of the repetitive wave shape, impinging the ultrasonic transmitted wave on a test surface of the test section within a predetermined range of angle so as to induce in the portion of the test section between the test surface and a reflecting surface spaced a distance no greater than about 100 mils from the test surface at least one mode of Lamb wave as an ultrasonic test wave, the ultrasonic test wave comprising a series of ultrasonic pulses each corresponding to one mode of Lamb wave produced in the test section, converting the ultrasonic test wave into an electrical test wave comprising a train of electrical test pulses each corresponding to one mode of Lamb wave produced in the test section, and correlating the train of electrical test pulses with the modulating frequencies along the repetitive wave shape.

Further features of the invention pertain to the particular arrangement of the parts of the ultrasonic nondestructive testing apparatus whereby the above-outlined and additional operating features thereof are attained.

The invention both as to its organization and method of operation, together with further objects and advantages thereof will best be understood by reference to the following specification taken in connection with the accompanying drawings, in which:

FIG. 1 is a diagram partially in block form and illustrating an ultrasonic nondestructive testing apparatus incorporating the features of the invention;

FIG. 2 is a graph showing a plot of the incident angle of ultrasound versus the product of the frequency of the ultrasound and the thickness of the test specimen for various Lamb wave modes; and FIG. 3 illustrates another embodiment of the ultrasonic testing apparatus.

Referring now to the drawings and more particularly to FIG. 1 thereof, there is shown an ultrasonic nondestructive testing apparatus 10 for use in inspecting a test specimen 12. The testing apparatus 10 includes a sawtooth generator 14 which generates a sawtooth wave 16 having a frequency of 60 hertz in the preferred embodiment. The sawtooth wave 16 is coupled to a voltage controlled oscillator 18 which generates a sine wave the instantaneous frequency of which is determined by the instantaneous amplitude of the sawtooth wave 16, whereby the oscillator 18 provides a continuous frequency-modulated electrical wave having a continuous frequency-modulation which is repetitive at a 60 hertz rate. After amplification in the power amplifier 20, the frequency-modulated electrical wave is coupled through a matching network 22 to a transmitting transducer 24, the matching network 22 serving to match the impedance of the power amplifier 20 to the transmitting transducer 24. The transmitting transducer 24 is fixedly mounted (the structure for mounting not being shown) in a tank 25, the tank 25 being filled with a coupling medium 26 such as water and having immersed therein the specimen 12 which is to be tested. The transmitting transducer 24 converts the amplified frequency-modulated electrical wave into an ultrasonic wave that is continuous and frequency-modulated at the sawtooth rate. The ultrasonic wave is then transmitted through the coupling medium 26 to impinge on the test surface 28 of the specimen 12 at an incident angle 27 measured from the normal to the surface 28. By an operation to be explained in detail hereinafter, the impingement of the transmitted ultrasonic wave on the surface 28 of the specimen 12 induces Lamb waves therein. The Lamb waves travel within the specimen 12 and exit therefrom at various points along the extent thereof and at an angle 29 measured from the normal to the specimen surface 28, the exit angle 29 being equal to the incident angle 27.

The exiting ultrasonic wave comprises a series of ultrasonic pulses which are picked up by a receiving transducer 30, the transducer 30 being fixedly mounted (the structure for mounting not being shown) in the tank 25 so as to be aligned with the exiting ultrasonic wave. The receiving transducer 30 converts the exiting ultrasonic wave into an electrical test wave comprising a train of electrical test pulses each corresponding to one mode of Lamb wave produced in the test section. After amplification in an amplifier 32, the electrical test wave is applied to a discriminator 34, the discriminator 34 extracting the frequency-modulation from the amplified electrical test wave applied thereto and thereby effectively reducing the frequency of the electrical test pulses.

The electrical test pulses from the discriminator 34 are applied to the vertical input 36 of an oscilloscope 38. A portion of the sawtooth wave 16 from the sawtooth generator 14 is applied to the horizontal input 40 of the oscilloscope 38 to deflect the electron beam thereof across the oscilloscope screen 41 at a uniform rate and to then snap the beam back to its starting point, such scanning operation being operated at a 60 hertz rate, that being the preferred frequency of the sawtooth wave 16. In addition, because the sawtooth wave 16 controls the frequency of the transmitted electrical wave applied to the transmitting transducer 24, the instantaneous horizontal position of the electron beam is synchronized with the instantaneous modulation frequency of the transmitted electrical wave. Accordingly, there will be depicted on the oscilloscope screen 41 a spectrum-type display representing the train of pulses from the discriminator 34; i.e., the pulse amplitudes are plotted against the frequencies thereof. In order to calibrate the horizontal deflection of the electron beam, a marking circuit 42 is coupled to the horizontal input 36 of the oscilloscope 38, which marker circuit causes one or more marks to appear on the oscillofiscope screen 41 at known frequencies.

Referring now to the tank 25 and the transducers 24 and 30 mounted therein, the method of inducing Lamb waves in the specimen 12 will now be explained. When the transmitted ultrasonic wave impinges upon the specimen surface 28 at the angle 27, a number of Lamb waves of vibration may be induced depending upon the material, the thickness of the specimen 12, the frequency of the ultrasonic wave and the angle 27. Once the specimen 12 is set into vibration, the ultrasonic waves therefrom are radiated into the water coupling medium 26 at an exit angle 29 equal to the incident angle 27. Each Lamb wave mode is propagated with a unique phase velocity that is related to the product of the frequency of the ultrasonic wave and the thickness of the specimen 12. The phase velocity is equal to $V/\sin x$ where V is the velocity of the transmitted ultrasonic wave in the coupling medium 26 and $x$ is the incident angle 27. FIG. 2 illustrates a graph of the frequency-thickness product plotted against the incident angle for an aluminum specimen, the coupling medium being water wherein the velocity of the transmitted ultrasonic waves is 58,660 inches per second. In FIG. 2, the alternate curves 44 are plots of successive symmetrical modes and are respectively labeled 1S, 2S, etc. The remaining curves 46 are plots of the asymmetrical modes and are respectively labeled 1A, 2A, etc. The two possible modes, namely the symmetrical and the asymmetrical modes, are distinguished only by the manner in which individual particles are displaced within the specimen and for the purposes of the present invention they may be considered equivalent. It is to be understood that similar curves as those shown in FIG. 2 exist for other materials such as tungsten and zirconium. The main criterion for the establishment of the Lamb waves modes is that the product of the thickness of the specimen 12 and the frequency of the transmitted ultrasonic wave bears the proper relationship to the incident angle.

In order to identify the orders of the Lamb wave modes being induced, the frequency of the ultrasonic wave impinging the specimen 12 is continually changed at a uniform rate between selected lower and upper frequency limits by action of the sawtooth generator 14, while the incident and exit angles 27 and 29 are maintained constant. In this manner, a number of Lamb wave modes will be induced in a specimen having a given thickness, each mode being induced in response to one of the frequencies generated. The Lamb wave modes when converted into the electrical test wave by the receiving transducer 30 and detected in discriminator 34 will be manifest as a train of pulses on the oscilloscope screen 41. As can be seen in FIG. 2, the first pulse will represent the 1S Lamb wave mode, the second pulse will represent the 2A mode, etc. It can be determined which mode gave rise to a particular pulse by counting the number of pulses preceding that pulse. By noting the point at which the value of the incident angle, intersects the curve corresponding to that particular mode, the frequency-thickness product can be determined. The frequency which generated that pulse is known because the oscilloscope 38 is calibrated, whereby the thickness of the specimen 12 can be calculated by dividing the frequency-thickness product by the frequency. It should be noted, however, that the frequency shift of the display on the oscilloscope screen 41 arising from the inherent time delay in the specimen 12 should be taken into account in order to obtain an accurate measurement.

The operation just explained may be best understood by way of an example. Suppose that the specimen 12 is free of defects and has a uniform thickness of 50 mils throughout the extent and that the incident angle 27 and the exit angle 29 are each 20°, and the frequency of the transmitted electrical wave applied to the transmitting transducer 24 varies from 2 to 16 megahertz at a 60 hertz rate. Accordingly, the range of frequency-thickness product will be 100 to 800 mil-megahertz; and by reference to the graph of FIG. 2 it will be seen that with such a frequency-thickness product range, 8 Lamb wave modes will be induced in the specimen 12. The electrical test wave generated by the receiving transducer 30 in response to these 8 Lamb wave modes will be detected in the discriminator 34 so as to produce a display on the oscilloscope screen 41 consisting of a train of 8 pulses. By referring to the graph of FIG. 2, it may be seen that the third pulse, for example, arose in response to the 2S mode; and that the 20° ordinate intersects the 2S curve at a frequency-thickness product of 255 mil-megahertz. Since the oscilloscope 38 is calibrated (taking into account the inherent time delay in the specimen 12), the frequency which generated the third pulse is known so that the thickness can be calculated by dividing the frequency-thickness product by the frequency.

It can be seen in the graph of FIG. 2, that for a given range of frequencies, more modes are induced in the specimen as the thickness thereof increases. As the number of modes increases, each mode is attenuated so that essentially no Lamb waves will be induced in specimens having a thickness in excess of a predetermined value, such value having been determined to be about 100 mils, whereby thickness measurements are feasible only when the specimen thickness is less than 100 mils.

The testing apparatus 10 is also useful in inspecting specimens having defects therein no greater than 100 mils below the surface thereof. If the specimen was manufactured by a rolling process, any defects therein would generally be flattened to produce a laminar defect which acts like a reflecting surface and causes the specimen to include a thin section between the surface and the defect in which Lamb waves may be induced. When the testing apparatus 10 is positioned on a section of the specimen which is free of defects, and if the specimen is relatively thick that is, the thickness exceeds 100 mils, no Lamb wave modes will be induced in that section. However, when the testing appaartus 10 is positioned over a section with a defect, Lamb wave modes will be induced according to the depth of the defect. Different types of defects will be reflected as pulses on the oscilloscope screen 41 having different amplitudes and different shape factors. Differences in the depths of the defects will be reflected as shifts in the frequencies at which particular pulses appear on the oscilloscope screen 41. The operator who uses the testing apparatus 10 may make rapid determinations as to the integrity of the various sections of the specimen by comparing the oscilloscope displays with one another and with the display representing a section which meets a predetermined standard.

Although an apparatus has been described for inspecting the specimen 12, components other than those shown will be useful in accomplishing this objective. Accordingly, another embodiment of the invention comprises the method of generating the continuous frequency-modulated electrical wave, converting the electrical wave into an ultrasonic transmitted wave that is continuous and frequency-modulated, impinging the ultrasonic transmitted wave upon the specimen 12 within the ranges of angle previously described. The ultrasonic pulses in the ultrasonic test wave are then converted into an electrical test wave and then applied to a correlating means such as the oscilloscope 38.

Lamb waves, although used in the past for inspection purposes, were induced in response to a train of pulses which proved to be somewhat unsatisfactory due to the low-energy content of the electrical wave. By the invention herein described, the electrical wave is continuous in character and thus has a substantially greater energy content. This is particularly desirable in Lamb wave testing so that the ultrasonic wave which leaves the specimen 12 not be of too low an intensity to be detected. In addition, in prior methods utilizing Lamb waves, the impinging ultrasonic wave had a fixed frequency, so that only one Lamb wave mode could be induced in the specimen 12, whereby comparison tests between various parts of the specimen were difficult to make. In contrast to this, the frequency of the ultrasonic wave from the transmitting transducer 24 has its frequency continually changed in order to induce a number of Lamb wave modes, as previously described.

A further advantage of using a frequency-modulated electrical wave and the resultant spectrum-type display on the oscilloscope screen 41 (FIG. 1) is that the incident and exit angle selections are not critical. For example, it may be appreciated that a large sheet is far from being truly flat, so that the incident and exit angles 27 and 29 are difficult to accurately measure, thereby rendering it difficult to obtain quantitative measurements. However, because the display on the oscilloscope screen 41 is a spectrum, precise angle measurements are unnecessary, since a display arising from the use of the testing apparatus 10 over one section of the specimen may be compared to the display arising from use of the testing apparatus over another section of the specimen. In addition, although certain Lamb wave modes are not induced in response to certain types of defects, this is not detrimental, because the displays are compared to one another.

The maximum frequency of the ultrasonic wave is limited by the characteristics of transducers presently available. In a practical embodiment the lower and upper frequency limits of the electrical wave should be within the range of 1 to 25 megahertz, and preferably between 2 to 16 megahertz. Although the testing apparatus 10 was described as consisting of two transducers, one performing a transmitting function and the other performing a receiving function, it may be appreciated that one transducer may be used to perform both functions. It is desirable to maximize the spacing between the pulses appearing on the oscilloscope screen 41 and to that end, the impingement and exist angles 27 and 29 are selected such that the curves are substantially spaced from one another, angles of from 10° to 30° having provided satisfactory results and angles of from 12° to 20° being preferable.

Referring now to FIG. 3, there is shown a second embodiment of the invention wherein the elements thereof are identified with the same reference numerals used in FIG. 1 with a factor of 100 added thereto. The testing apparatus 110 includes a sawtooth generator 114 which generates a sawtooth wave 116 for controlling the instantaneous frequency of the sine wave generated by the voltage-controlled oscillator 118. The frequency-modulated electrical wave thereby developed is amplified in the power amplifier 120 and coupled through a matching network 122 to the transmitting transducer 124. The transmitting transducer 124 converts the amplified frequency-modulated electrical wave into a continuous ultrasonic wave which is then transmitted through the coupling medium 126 to impinge the adjacent surface 28 of the specimen 12 at an angle 127. The Lamb waves thereby induced in the specimen 12 exit therefrom and are picked up by the receiving transducer 130, the transducer 130 converting the exiting ultrasonic wave into a frequency-modulated electrical test wave. After amplification in amplifier 132 the electrical test wave is applied to a mixer 50. Also applied to the mixer 50 is a portion of the continuous frequency-modulated electrical wave generated by the voltage controlled oscillator 118. Because of the inherent time required for a Lamb wave to traverse its path from the transmitting transducer 124 to the receiving transducer 130 and because the frequency of the electrical wave is increased at a constant rate, a constant frequency different signal and a constant frequency sum signal exists at the output of the mixer 50. After amplification in amplifier 52, the sum and difference frequency signals are applied to a filter 54 which passes the frequency difference signal and rejects the sum frequency signal. In the preferred embodiment, the time delay in the specimen 12 is such as to cause the carrier frequency of the difference frequency signal to be on the order of 10 kilohertz. The difference frequency signal is applied to the discriminator 134 wherein the frequency modulation is extracted to provide a train of reduced-frequency electrical test pulses. The electrical test pulses are applied to the oscilloscope 138 as is the sawtooth wave 116 from the sawtooth generator 114 in similar fashion to that described with reference to FIG. 1. The display on the oscilloscope screen 141 will depict the same information as that depicted on the oscilloscope screen 41 of FIG. 1.

An advantage of the testing apparatus 110 is that amplifier 52 may have a narrow bandwidth response on the order of, for example, 10 kilohertz; whereas the amplifier 32 in the testing apparatus 10 of FIG. 1 must have a wide bandwidth response of 16 megahertz or more. A narrow bandwidth improves the signal-to-noise ratio of the amplifier so that the amplitude of the transmitted electrical wave may be proportionately less. This is desirable since the testing apparatus is to be primarily used in inspecting thin specimens which could be damaged by a transmitted wave of substantial power.

Since the carrier wave frequency of the signal applied to the discriminator 134 is dependent on the time it takes for the Lamb wave to traverse the path from the transmitting transducer 124 to the receiving transducer 130, and since this time is in turn dependent on the density of the specimen 12, the testing apparatus 110 may be used to measure density in addition to making thickness measurements and defect inspections.

What has been described, therefore, is an improved ultrasonic testing apparatus and method wherein an electrical wave is converted into an ultrasonic wave which impinges a specimen in such a manner as to induce Lamb waves therein, the electrical wave being a continuous frequency-modulated electrical wave in order to provide a spectrum-type display of the Lamb waves.

While there has been described what is at present considered to be the preferred embodiments of the invention, it will be understood that various modifications may be made therein, and it is intended to cover in the appended claims all such modifications as fall within the true spirit and scope of the invention.

What is claimed is:

1. An ultrasonic nondestructive testing apparatus for inspecting test sections to depths no greater than about 100 mils, said apparatus comprising a generator for providing a continuous frequency-modulated electrical wave having a continuous frequency-modulation of a repetitive wave shape including at least a portion of a predetermined frequency range, transducer means for converting said electrical wave into an ultrasonic transmitted wave and transmitting said ultrasonic wave to the test section and receiving an ultrasonic test wave out of the test section and converting said ultrasonic test wave into an electrical test wave, said ultrasonic wave being continuous and frequency-modulated of said repetitive wave shape, means for coupling said transducer means to a test surface of the test section so as to impinge the ultrasonic wave on the test surface within a predetermined range of angle so as to induce in the portion of the test section between the test surface and a reflecting surface spaced a distance no greater than about 100 mils from the test surface at least one mode of Lamb wave as said ultrasonic test wave, said ultrasonic test wave comprising a series of ultrasonic pulses each corresponding to one mode of Lamb wave produced in the test section, the ultrasonic test wave being transmitted from the test surface through said coupling means back to said transducer means, said transducer means converting the ultrasonic pulses in said ultrasonic test wave into an electrical test wave comprising a train of electrical test pulses each corresponding to one mode of Lamb wave produced in the test section, and means for correlating said train of electrical test pulses with the modulating frequencies along said repetitive wave shape.

2. The ultrasonic nondestructive testing apparatus set forth in claim 1, wherein said predetermined frequency range is 1 to 25 megahertz.

3. The ultrasonic nondestructive testing apparatus set forth in claim 1, wherein said predetermined range of angle is 10 to 30 degrees.

4. The ultrasonic nondestructive testing apparatus set forth in claim 1, wherein said predetermined range of angle is 12 to 20 degrees, and said predetermined frequency range is 2 to 16 megahertz.

5. The ultrasonic nondestructive testing apparatus set forth in claim 1, wherein said generator includes means for providing a sawtooth wave, and a voltage controlled oscillator responsive to said sawtooth wave to provide said continuous frequency-modulated electrical wave.

6. The ultrasonic nondestructive testing apparatus set forth in claim 1, wherein said generator includes means for providing a sawtooth wave and a voltage controlled oscillator responsive to said sawtooth wave to provide said continuous frequency-modulated electrical wave, and said correlating means includes an oscilloscope with associated vertical and horizontal inputs, said sawtooth wave being coupled to said horizontal input and said train of electrical test pulses being coupled to said vertical input, whereby a frequency-versus-amplitude plot of the Lamb wave modes is displayed on the screen of the oscilloscope.

7. An ultrasonic nondestructive testing apparatus for inspecting test sections to depths no greater than about 100 mils, said apparatus comprising a generator for providing a continuous frequency-modulated electrical wave having a continuous frequency-modulation of a repetitive wave shape including at least a portion of a predetermined frequency range, a transmitting transducer for converting said electrical wave into an ultrasonic wave that is continuous and frequency-modulated of said repetitive wave shape, means for coupling said transmitting transducer to a test surface of the test section so as to impinge the ultrasonic wave on the test surface within a first predetermined range of angle so as to induce in the portion of the test section between the test surface and a reflecting surface no greater than about 100 mils from the test surface at least one mode of Lamb wave as an ultrasonic test wave, said ultrasonic test wave comprising a series of ultrasonic pulses each corresponding to one mode of Lamb wave produced in the test section, a receiving transducer for converting the ultrasonic test wave into an electrical test wave comprising a train of electrical test pulses each corresponding to one mode of Lamb wave produced in the test section, the ultrasonic test wave being transmitted from the test surface within a second predetermined range of angle through said coupling means to said receiving transducer, and means for correlating said train of electrical test pulses with the modulating frequencies along said repetitive wave shape.

8. The ultrasonic nondestructive testing apparatus set forth in claim 7, wherein said predetermined frequency range is 1 to 25 megahertz.

9. The ultrasonic nondestructive testing apparatus set forth in claim 7, wherein said first and second predetermined ranges of angle are substantially equal and each have a value of from 10 to 30 degrees.

10. The ultrasonic nondestructive testing apparatus set forth in claim 7, wherein said first and second predetermined ranges of angle are substantially equal and each have a value of from 12 to 20 degrees, and said predetermined frequency range is 2 to 16 megahertz.

11. The ultrasonic nondestructive testing apparatus set forth in claim 7, and further comprising a power amplifier coupled between said generator and said transmitting transducer for amplifying said continuous frequency-modulated electrical wave.

12. The ultrasonic nondestructive testing apparatus set forth in claim 7, and further comprising a power amplifier coupled to said generator for amplifying said continueus frequency-modulated electrical wave, and a matching network coupled between said power amplifier and said transmitting transducer to provide an impedance match therebetween.

13. The ultrasonic nondestructive testing apparatus set forth in claim 7, wherein said receiving and transmitting transducers are mounted in a tank, and said coupling means includes water in said tank, with the specimen immersed in use in the water.

14. The ultrasonic nondestructive testing apparatus set forth in claim 7, and a discriminator coupled between said receiving transducer and said correlating means for effectively reducing the frequency of said electrical test pulses.

15. The ultrasonic nondestructive testing apparatus set forth in claim 7, and further comprising an amplifier coupled to said receiving transducer for amplifying said electrical test wave.

16. An ultrasonic nondestructive testing apparatus for inspecting test sections to depths no greater than about 100 mils, said apparatus comprising a generator for providing a continuous frequency-modulated electrical wave having a continuous frequency-modulation of a repetitive wave shape including at least a portion of a predetermined frequency range, transducer means for converting said electrical wave into an ultrasonic transmitted wave and transmitting said ultrasonic wave to the test section and receiving an ultrasonic test wave out of the test section and converting said ultrasonic test wave into an electrical test wave, said ultrasonic wave being continuous and frequency-modulated of said repetitive wave shape, means for coupling said transducer means to a test surface of the test section so as to impinge the ultrasonic wave on the test surface within a predetermined range of angle so as to induce in the portion of the test section between the test surface and a reflecting surface spaced a distance no greater than about 100 mils from the test surface at least one mode of Lamb wave as said ultrasonic test wave, said ultrasonic test wave comprising a series of ultrasonic pulses each corresponding to one mode of Lamb wave produced in the test section, the ultrasonic test wave being transmitted from the test surface through said coupling means back to said transducer means, said transducer means converting the ultrasonic pulses in said ultrasonic test wave into an electrical test wave comprising a train of electrical test pulses each corresponding to one mode of Lamb wave produced in the test section, a mixer for combining said electrical test wave and a portion of the electrical wave provided by said generator to provide a difference frequency electrical test wave and a sum frequency electrical test wave, a low pass filter coupled to said mixer for passing only said difference frequency electrical test wave, and means for correlating the train of electrical test pulses in said difference frequency electrical test wave with the modulating frequencies along said repetitive wave shape.

17. The ultrasonic nondestructive testing apparatus set forth in claim 16, wherein the bandpass of said low pass filter is on the order of 0 to 100 kilohertz.

18. The ultrasonic nondestructive testing apparatus set forth in claim 16, and further comprising a discriminator coupled between said low pass filter and said correlating means for effectively reducing the frequency of said electrical test pulses in said difference frequency electric test wave.

19. An ultrasonic nondestructive testing method for inspecting test sections to depths no greater than about 100 mils, said method comprising the steps of generating a continuous frequency-modulated electrical wave having a continuous frequency-modulation of a repetitive wave shape including at least a portion of a predetermined frequency range, converting said electrical wave into an ultrasonic transmitted wave that is continuous and frequency-modulated of said repetitive wave shape, impinging the ultrasonic transmitted wave on a test surface of the test section within a predetermined range of angle so as to induce in the portion of the test section between the test surface and a reflecting surface spaced a distance no greater than about 100 mils from the test surface at least one mode of Lamb wave as an ultrasonic test wave, said ultrasonic test wave comprising a series of ultrasonic pulses each corresponding to one mode of Lamb wave produced in the test section, converting said ultrasonic test wave into an electrical test wave comprising a train of electrical test pulses each corresponding to one mode of Lamb wave produced in the test section, and correlating said train of electrical test pulses with the modulating frequencies along said repetitive wave shape.

20. The ultrasonic nondestructive testing method set forth in claim 19, wherein said predetermined frequency range is 1 to 25 megahertz.

21. The ultrasonic nondestructive testing method set forth in claim 19, wherein said predetermined range of angle is 10 to 30 degrees.

22. The ultrasonic nondestructive testing method set forth in claim 19, wherein said predetermined range of angle is 12 to 20 degrees, and said predetermined frequency range is 2 to 16 megahertz.

23. The ultrasonic nondestructive testing method set forth in claim 19, and further comprising the step of amplifying said continuous frequency-modulated electrical wave before conversion thereof into said ultrasonic transmitted wave.

24. The ultrasonic nondestructive testing method set forth in claim 19, and further comprising the step of effectively reducing the frequency of said electrical test pulses before the correlation thereof.

25. An ultrasonic nondestructive testing method for inspecting test sections to depths no greater than about 100 mils, said method comprising the steps of generating a continuous frequency-modulated electrical transmitted wave having a continuous frequency-modulation of a repetitive wave shape and including at least a portion of a predetermined frequency range, converting said electrical transmitted wave into a continuous and frequency-modulated ultrasonic transmitted wave having said repetitive wave shape, impinging the ultrasonic transmitted wave on a test surface of the test section within a predetermined range of angle so as to induce in the portion of the test section between the test surface and a reflecting surface spaced a distance no greater than about 100 mils from the test surface at least one mode of Lamb wave as an ultrasonic test wave, said ultrasonic test wave comprising a series of ultrasonic pulses each corresponding to one mode of Lamb wave produced in the test section, converting the ultrasonic pulses in said ultrasonic test wave into an electrical test wave comprising a train of electrical test pulses each corresponding to one mode of Lamb wave produced in the test section, mixing the electrical test wave and a portion of said electrical transmitted wave to provide a difference frequency electrical test wave and a sum frequency electrical test wave, passing said difference frequency electrical test wave and rejecting said sum frequency electrical test wave, and correlating the train of electrical test pulses in said difference frequency electrical test wave with the modulating frequencies along said repetitive wave shape.

26. The ultrasonic nondestructive testing method set forth in claim 25, wherein the step of correlating said electrical test pulses with the modulating frequencies comprises displaying said electrical test pulses on an oscilloscope whose sweep is synchronized with the repetitive wave shape of said continuous frequency-modulated electrical wave.

References Cited
UNITED STATES PATENTS
3,135,942  6/1964  Tucker et al. ---------- 340—3
3,407,649  10/1968  Dickinson ---------- 73—67.5

OTHER REFERENCES
Roberta di Novi: "Lamb Waves: Their Use in Nondestructive Testing," Argonne Nat'l Lab publication, March 1963, pp. 5–12.

D. C. Worlton: "Lamb Waves at Ultrasonic Frequencies," A.E.C. R&D Report, June 9, 1959, pp. 18–30.

RICHARD C. QUEISSER, Primary Examiner

A. E. KORKOSZ, Assistant Examiner